US010198716B2

United States Patent
Bansal et al.

(10) Patent No.: US 10,198,716 B2
(45) Date of Patent: Feb. 5, 2019

(54) USER AVAILABILITY AWARENESS

(75) Inventors: Vipul Bansal, Sammamish, WA (US); Jeroen Vanturennout, Snohomish, WA (US); Ranjib Singh Badh, Sammamish, WA (US); Eyal Axelrod, Redmond, WA (US); Alton Kwok, Redmond, WA (US); Ritu Varma, Redmond, WA (US); Yosef Firstenberg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1014 days.

(21) Appl. No.: 13/294,267

(22) Filed: Nov. 11, 2011

(65) Prior Publication Data
US 2013/0124642 A1 May 16, 2013

(51) Int. Cl.
G06Q 10/10 (2012.01)
H04L 12/12 (2006.01)

(52) U.S. Cl.
CPC .......... *G06Q 10/107* (2013.01); *H04L 12/12* (2013.01); *Y02D 50/40* (2018.01)

(58) Field of Classification Search
CPC ...... G06Q 10/107; H04L 12/585; H04L 12/58
USPC ........................................................ 709/206
See application file for complete search history.

(56) References Cited

U.S. PATENT DOCUMENTS

| | | | |
|---|---|---|---|
| 7,257,644 B2 * | 8/2007 | Simonnet et al. ............ 709/238 |
| 7,444,135 B2 * | 10/2008 | Klassen ................ H04L 12/581 |
| | | | 455/412.2 |
| 7,739,210 B2 * | 6/2010 | Horvitz ................ G06Q 10/109 |
| | | | 706/21 |
| 7,890,701 B2 * | 2/2011 | Lowery ............... G06F 17/3087 |
| | | | 709/216 |
| 8,015,249 B2 * | 9/2011 | Nayak ................... H04M 15/00 |
| | | | 379/130 |
| 8,363,644 B2 * | 1/2013 | Kreitzberg .............. H04L 67/24 |
| | | | 370/352 |
| 8,700,690 B2 * | 4/2014 | Raghav ................ G06Q 10/107 |
| | | | 709/201 |

(Continued)

OTHER PUBLICATIONS

Microsoft, "Presence Survival Guide," retrieved from a Microsoft online support page, Jul. 2007.*

(Continued)

*Primary Examiner* — Nicholas R Taylor
*Assistant Examiner* — Chong G Kim

(57) ABSTRACT

One or more techniques and/or systems are disclosed for providing awareness of user availability. A user may activate a device, and a request to manage an availability status can be sent from the device to a communication service. The communication service may resultantly set up monitoring of the user status, and the availability status of the user can be set to available. If an active status update is not received from the user device, the availability status of the user can be changed from available to away. If an active status update for the user continues not to be received (e.g., for a few hours) and/or device connectivity seems lost, the availability status of the user can be changed from away to offline. This can be done in a resource/power efficient manner by not requiring continual execution of an associated application and/or continual network connectivity of the device.

20 Claims, 8 Drawing Sheets

(56) References Cited

U.S. PATENT DOCUMENTS

| | | | |
|---|---|---|---|
| 2003/0233537 A1* | 12/2003 | Wohlgemuth | H04L 63/0209 713/151 |
| 2004/0117443 A1* | 6/2004 | Barsness | G06Q 10/10 709/204 |
| 2004/0249776 A1* | 12/2004 | Horvitz | G06Q 10/109 706/21 |
| 2004/0268265 A1* | 12/2004 | Berger | G06F 1/1622 715/752 |
| 2005/0068167 A1* | 3/2005 | Boyer | H04L 12/581 340/531 |
| 2005/0071428 A1* | 3/2005 | Khakoo | G06Q 10/107 709/204 |
| 2006/0020707 A1* | 1/2006 | Undery | H04L 29/06 709/230 |
| 2006/0053379 A1* | 3/2006 | Henderson | G06F 3/0481 715/751 |
| 2006/0117050 A1* | 6/2006 | John | H04M 3/42365 |
| 2006/0155733 A1* | 7/2006 | John | H04M 3/42374 |
| 2006/0190117 A1* | 8/2006 | Weczorek | H04L 12/581 700/103 |
| 2006/0286993 A1* | 12/2006 | Xie | H04W 76/005 455/518 |
| 2007/0067443 A1* | 3/2007 | Seligmann | H04L 67/104 709/224 |
| 2007/0233875 A1* | 10/2007 | Raghav et al. | 709/227 |
| 2007/0268130 A1* | 11/2007 | Yee | G06Q 20/40145 340/540 |
| 2007/0276937 A1* | 11/2007 | Chavda | H04L 12/5815 709/224 |
| 2007/0293207 A1* | 12/2007 | Guedalia | H04M 3/42365 455/415 |
| 2008/0056155 A1* | 3/2008 | Lahtiranta et al. | 370/254 |
| 2008/0086528 A1* | 4/2008 | Garg | G06F 11/3495 709/204 |
| 2008/0148154 A1* | 6/2008 | Burrell | H04L 12/1895 715/733 |
| 2008/0242231 A1* | 10/2008 | Gray | H04M 1/72563 455/66.1 |
| 2008/0256192 A1* | 10/2008 | Pinard | G06Q 30/02 709/206 |
| 2008/0261630 A1* | 10/2008 | Wormald | H04M 1/72552 455/466 |
| 2008/0291896 A1* | 11/2008 | Tuubel | H04L 12/5815 370/352 |
| 2008/0294772 A1* | 11/2008 | Hagale | H04L 67/24 709/224 |
| 2008/0311961 A1* | 12/2008 | Cotevino | H04W 4/16 455/574 |
| 2009/0006528 A1* | 1/2009 | Batni | H04M 1/72519 709/203 |
| 2009/0009343 A1* | 1/2009 | Boyer | H04L 51/04 340/573.1 |
| 2009/0247154 A1* | 10/2009 | Zabawskyj | H04L 67/24 455/433 |
| 2009/0319655 A1* | 12/2009 | Viamonte Sole | H04L 67/24 709/224 |
| 2010/0002859 A1* | 1/2010 | Hepworth | G06Q 10/10 379/140 |
| 2010/0197351 A1 | 8/2010 | Ewell, Jr. et al. | |
| 2010/0205539 A1* | 8/2010 | Gestsson | G06Q 10/107 715/752 |
| 2010/0235423 A1* | 9/2010 | Lee | H04L 67/24 709/202 |
| 2010/0281409 A1* | 11/2010 | Rainisto et al. | 715/767 |
| 2010/0299615 A1* | 11/2010 | Miluzzo | H04W 4/02 715/752 |
| 2011/0013558 A1* | 1/2011 | Chang | G06F 9/4443 370/328 |
| 2011/0064074 A1 | 3/2011 | Kreitzberg et al. | |
| 2011/0087778 A1* | 4/2011 | Knauerhase | H04L 12/581 709/224 |
| 2011/0196960 A1* | 8/2011 | Boberg | H04L 67/24 709/224 |
| 2011/0258308 A1* | 10/2011 | Arumugam | H04L 67/24 709/224 |
| 2011/0314151 A1* | 12/2011 | Wyld | H04L 43/0805 709/224 |
| 2012/0009908 A1* | 1/2012 | Wisebourt | H04L 12/5815 455/414.2 |
| 2012/0142318 A1* | 6/2012 | Okon | H04W 4/206 455/413 |
| 2012/0158859 A1* | 6/2012 | Saxena | H04L 51/30 709/206 |
| 2012/0300698 A1* | 11/2012 | Lindner | H04W 4/08 370/328 |
| 2013/0002441 A1* | 1/2013 | Khan | H04L 67/306 340/636.1 |
| 2013/0007130 A1* | 1/2013 | Lu | H04L 67/24 709/204 |
| 2013/0297707 A1* | 11/2013 | Beerse | H04L 51/04 709/206 |
| 2014/0047053 A1* | 2/2014 | Chawla | H04M 3/42357 709/206 |
| 2014/0067968 A9* | 3/2014 | Agrawal | H04L 12/581 709/206 |
| 2015/0033235 A1* | 1/2015 | Engdal | G06F 9/4881 718/102 |
| 2015/0215413 A1* | 7/2015 | Lindner | H04L 67/24 709/224 |

OTHER PUBLICATIONS

Horvitz et al. "Coordinate: Probabilistic forecasting of presence and availability", Proceedings of the Eighteenth conference on Uncertainty in artificial intelligence, Morgan Kaufmann Publishers Inc., 2002.*

Tso, et al., "Always on, Always Connected Mobile Computing", Retrieved at <<http://ieeexplore.ieee.org/stamp/stamp.jsp?tp=&arnumber=562712>>, Proceedings of the 5th IEEE International Conference on Universal Personal Communications (UPC), Sep. 29, 1996, vol. 2, pp. 918-924.

Kulkarni, et al., "IDC: An Energy Efficient Communication Scheme for Connected Mobile Platforms", Retrieved at <<http://ieeexplore.ieee.org/stamp/stamp.jsp?tp=&arnumber=5199061>>, IEEE International Conference on Communications (COMM), Jun. 14-18, 2009, pp. 1-6.

* cited by examiner

USER AVAILABILITY AWARENESS

BACKGROUND

A user can utilize the Internet to communicate with one or more connections (e.g., other users, friends, buddies, etc.) using a variety of techniques. For example, the user can send an email, chat live using instant messaging (IM), send a text message to a phone, video chat, voice chat using voice over Internet Protocol (VoIP), etc. Typically, respective communication techniques utilize a corresponding application, which is executing on the user's device (e.g., used for communicating), where the corresponding application may be specific to the type of communication (e.g., an IM program), or may comprise a web-based application running in a user's browser on the device. Another user may determine whether the user is available to communicate by using a communication service that provides an indication of availability (e.g., "available," "away," "online," "offline").

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Users often connect online using mobile devices, such as handheld computers (e.g., smart-phones, tablets, media players, gaming consoles, etc.) and laptop computers, for example. Typically, mobile devices are more limited than desktop or stationary devices in terms of computing resources (e.g., CPU power, memory, storage, etc.) and electrical power availability (e.g., due to utilizing merely battery provided power). Currently, when a user wishes to provide awareness of their online communication availability (e.g., for IM, chat, video, voice, etc.), the user needs to have at least some of a corresponding application running (continually) on the device. For example, if the user wishes to make their connections (e.g., other users) aware that they are available (e.g., or some form of "available", such as available but presently busy) for IM communication, the user may need to have an IM program running and/or have their browser running an IM web-app.

Because mobile devices comprise limited computing and power resources, running applications on the device can reduce a user experience, for example, by taking up valuable computing resources and/or draining battery power more quickly. Also, a persistent notification channel may need to be maintained to allow a mobile device and/or applications thereon to receive communications (e.g., instant messages), which can drain battery power. Further, mobile devices may be susceptible to connection loss, as most mobile devices connect to a network, such as the Internet, over a wireless connection, such as a cellular or Wi-Fi connection, for example. As such, maintaining an awareness of communication availability of the user may be hindered by such connection loss. With such intermittent connectivity a user status and/or other data relevant to a user may become stale, and/or too many (e.g., non-essential) notifications may be sent should such notifications be sent every time connectivity is re-established (e.g., where spotty connectivity can result in many disconnections/reconnections in a relatively short period of time).

Accordingly, one or more techniques and/or systems are disclosed where a user's availability for online communication can be provided without having a corresponding application running on the user device, and/or without having a constant connection to a communication network, for example. A background task or background work item (e.g., a short-lived, triggered on-demand executable, such as application and/or condition defined, triggered code for example) may be able to identify when the user is active on (e.g., interacting with) their device, and/or when the device is connected to a network (e.g., the Internet or a cellular network, etc.). Further, status updates for the user may be sent periodically, and a communication service may determine whether the updates meet a desired timing threshold. Based on the determination, the communication service can assign an appropriate user availability status, which may be provided to one or more of the user connections (e.g., other users).

In one embodiment of providing awareness of user availability, a request to manage an availability status for a user can be received, such as by a communication service. Further, the availability status of the user can be set to available (e.g., available for online communication, at least in some form and/or at some time). Additionally, the availability status of the user can be changed to away (e.g., not immediately available (e.g., busy, away from desk, etc.), but still online and/or connected to, reachable through, etc. a service) if an active status update is not received for the user within a desired first time period.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
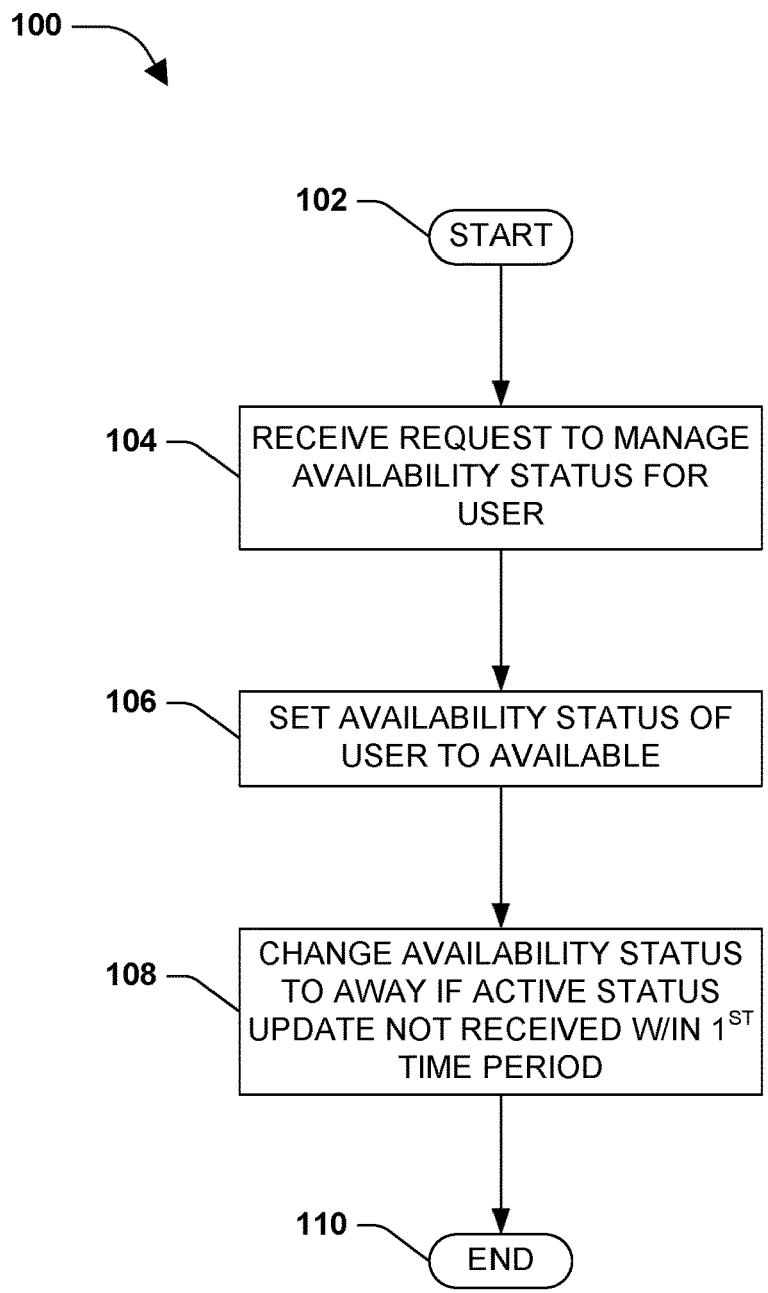
FIG. 1 is a flow diagram illustrating an exemplary method for providing awareness of user availability.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, a method may be devised that can provide an online status of a user, for example, without having a communication application (e.g., instant messaging (IM), voice over Internet Protocol (VoIP), contact aggregation, etc.) executing on a device utilized by the user. The user may activate their device, for example, which provides a status update to a communication service. The communication service can update the status of the user to the user connections (e.g., other users), in response to receiving periodic status updates from the user's device. If the communication service does not receive an appropriate update within a specified period, the service may change the user's online status.

FIG. 1 is a flow diagram illustrating an exemplary method 100 for providing awareness of user availability, such as an online status of a user, for example. The exemplary method 100 begins at 102. At 104, a request to manage an availability status for a user can be received, such as by a communication service. In one example, a request to manage the availability status of the user may be sent from a device when the user logs onto and/or activates the device. Further, as an example, the online status of the user may comprise an indication of a level of availability of the user for communication (e.g., chatting via IM), such as available for communication, online but not immediately available, and not available (e.g., as well as sub-levels of the respective levels of availability).

It may be appreciated that, "available" and/or the like can comprise any number of one or more levels and/or types of availability, which may be influenced, at least in part by any number of one or more factors, criteria, conditions, etc. such as an activity within which the user may be (actively) engaged, where the activity and/or level of user participation therein may be determined automatically (e.g., programmatically) and/or manually (e.g., established, designated, etc. by the user and/or otherwise). As an illustrative example, the user may activate their device and begin watching a video. Typically, for example, when watching a video, the user may not wish to be disturbed unless a potential received communication comprises a sufficient level of importance. In this example, the user's availability status may comprise "available but busy", "do not disturb", etc. (e.g., or some other term or phrase that denotes a desired level and/or type of (limited) availability). That is, in one embodiment, it may be detected that the user is actively engaged in a particular activity that indicates a particular level of participation. In this embodiment, for example, the user's available level and/or type may be set in accordance with the particular activity. It may thus be appreciated that "available" and/or the like merely denotes that the user may be available to communicate and/or respond to a communication, and is not intended to limit an extent of availability of the user. As an example, the user can be "available, but temporarily away," "immediately available," "available merely for Level X communications" (e.g., where "X" denotes a desired importance level) and/or any other descriptors that may denote a level and/or type of availability, for example.

In one embodiment, the request to manage the online status of the user may comprise a request to monitor availability for one or more types of online communications. Connections of the user (e.g., contacts, friends, address-book listing, etc.) may communicate with the user via IM, VoIP, texting, email, video and/or other types of online (e.g., network and/or Internet-based) communications, for example. In this embodiment, the communication service receiving the request may be able to provide the online availability status to user connections that are connected to the user via one or more communication protocols, for example. In one example, the user may have an IM set of connections, a VoIP set of connections, a text set of connections, and more. In this example, the user availability may be managed for one or more of these sets of connections, such that the user's online status may be provided to the connections in one or more of the sets. In one embodiment, the user may select which one or more of the communication protocols may be provided with the status availability updates, for example, limiting the availability awareness to one, a few, or all of the protocols utilized by the user.

At 106 in the exemplary method 100, the availability status of the user is set to available. As an example, the communication service may initiate an online availability status for the user (e.g., viewed by one or more user connections), and set the status to available. In one example, when the user activates their device, such as a portable computing device (e.g., smart-phone), they may be considered to be actively engaged in use of the device, and therefore available for communication from one or more of their connections. In this example, setting the user's status to available (e.g., or some formulation, derivative, etc. thereof) may let the user's connections know that the user may now be contacted using one or more communication protocols (e.g., and optionally communication capabilities, such as able to IM, but not receive file transfers, etc., for example).

At 108, the availability status of the user is changed to away if an active status update is not received for the user within a desired first time period. In one example, the user device may periodically send status updates to the communication service (e.g., in the absence of having a corresponding communication application (e.g., IM application) executing on the device) that indicate the availability of the user, such as for online communication. In one embodiment, if the communication service does not receive an active status update (e.g., that indicates the user is still interacting with the device) within a desired threshold time period (e.g., every fifteen minutes), the communication service may change the user status from available to away (e.g., online but away from the device at this time). In this way, for example, the communication service may not need to maintain contact (e.g., physical network connection) with the user's device in order to make a determination to change the user's status (e.g., where the lack of a contact, connection, etc. with the device may prolong battery life of the device). In this example, merely not receiving a communication can trigger the status change. (In one example, if a response code from a notification service indicates that the device is offline then the communication service will accept that as the latest status of the device and note this state internally and notify associated communications (e.g., other users) accordingly.)

It may be appreciated that "away" and/or the like may merely denote a type and/or level of "away" availability for the user. As an example, "away" may denote that the user is currently not available for immediate communication, but may be able to respond in some desired period of time. That is, for example, the "away" status may comprise levels of granularity that may be devised by those skilled in the art, such as "temporarily away," "away for a day," "away for a week" etc. Moreover, akin to the foregoing discussion with regard to "available" and/or the like, "away" and/or the like is not meant to be limiting or limited to any particular type, variation, etc. of "away", and may be influenced, at least in part by any number of one or more factors, criteria, conditions, etc. Similarly, "active" (e.g., status) and/or "online" (e.g., status) and/or the like are not meant to be interpreted in a limiting, limited, etc. manner.

Having changed the user status to away, if the active status update was not received, the exemplary method 100 ends at 110.

Figure 2:
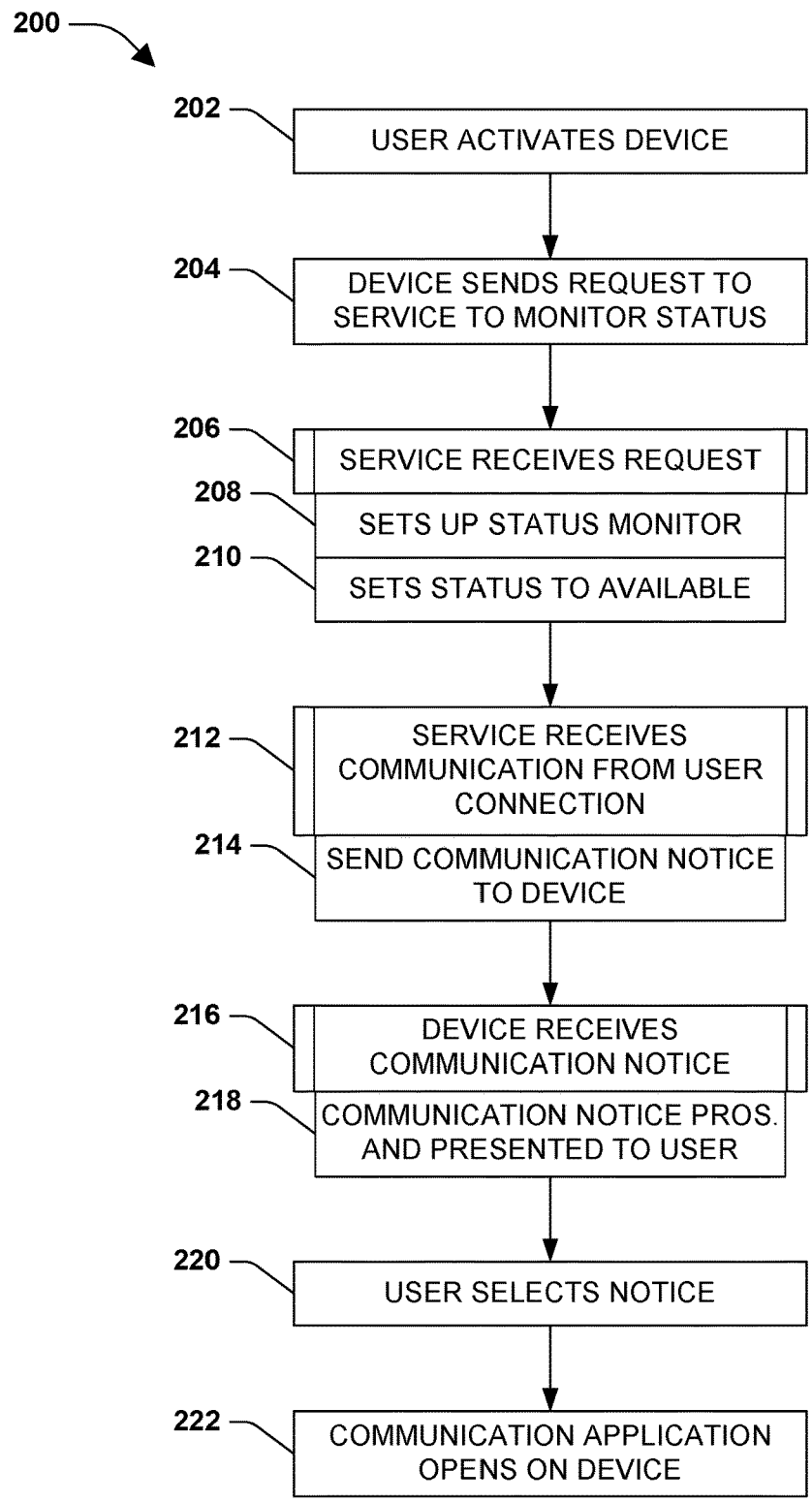
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented. In the example embodiment 200, a user may activate (e.g., power-up and/or login) a device (e.g., a portable computing device), at 202. Typical mobile devices (e.g., laptops, tablets, handheld consoles, media players, smart-phones, smart-cameras, etc.) can be limited in an amount of computing resources and/or available electrical power, for example, due to their size and use limitations, when compared with a stationary computing system. In one example, when the user is mobile (e.g., away from a computer station, such as a desktop or docking station) they may wish to mitigate power consumption and/or computing resource use for their mobile device.

In one embodiment, power consumption and/or computing resource use may be mitigated by providing awareness of user availability without a corresponding application (continually) in an execution state and/or by not requiring a persistent, continual, etc. connection to a communication service. In one embodiment, the corresponding application can comprise an application that may be used for communicating between the user and a user connection. For example, an IM program may be used to send IMs back and forth between the user and a user connection; a VoIP program may be used to have a live chat and/or video chat between the user and the user connection; and/or a connection aggregation program may be used to identify and monitor an availability status for one or more connections to the user. In this embodiment, the user availability awareness, provided to one or more connections to the user, can be managed without having one (e.g., any) of these example communication applications (continually) running on the user's mobile device, for example.

In one embodiment, activating the user device can comprise powering the device on and/or turning on the screen of the device (e.g., since AOAC (always on always connected) devices (e.g., smart phone) may be considered to always be on). In one embodiment, activating the device can comprise the user logging onto the device, such as with a username and password. In one embodiment, activating the device may comprise setting up a connection (e.g., connecting to) a network, such as the Internet. In yet another embodiment, activating the user device can comprise the user logging onto an online service associated with the communication service, such as one that comprises and/or aggregates one or more communication services (e.g., a connection aggregation service).

At 204 in the example embodiment 200, a request to monitor/manage the user's availability status can be sent from the device to a communication service. In one embodiment, the request to monitor may be sent from the device upon activation of the user device (e.g., automatically and/or programmatically). In one embodiment, the user may authorize sending the request to monitor from the device, such as after activation of the device. In one embodiment, the communication service may comprise an online service that provides availability status management for a user, for example, without the user needing to activate and/or actively run a corresponding application (e.g., or portion thereof) on the device.

In one embodiment, the communication service may comprise a local portion of a communication service used by one or more corresponding communication applications. For example, an online IM service may utilize a local application on respective computing devices to provide the IMs between the user and the user connection. As another example, a VoIP service may utilize a local application on respective devices that are communicating via the VoIP service. However, in this embodiment, the one or more local applications may not need to be in an execution state for the communication service to manage user availability status.

At 206, the communication service may receive the request to monitor/manage. In this example embodiment 200, at 208, upon receiving the request to monitor, the communication service can set up a status monitoring channel for the user, and set the initial availability status of the user to "available," at 210. As an example, when the user activates their device they may be considered to be "currently active" and, therefore, available for communicating with one or more user connections. In one embodiment, the user may modify default settings for the request to monitor, for example, such that the initial setting of the availability status comprises an alternate status (e.g., away, busy, etc.).

In one embodiment, when the communication service sets up the management of the user availability status, the user's availability status is made available to one or more of the user's connections associated with the communication service. As an example, the communication service may comprise a network connected server that broadcasts the user availability status to user connections that may be registered with and/or connected to the service. In this example, a user connection may utilize a type of dashboard user interface (UI) element that can indicate the user availability status, where the dashboard UI element is connected with the communication service to receive status updates.

At 212 in the example embodiment 200, the communication service may receive a communication request from a user connection, for example, directed to the user. As an example, the user connection may see the user availability status provided by the communication service and initiate a communication with the user, based on the provided status (e.g., "available" or "online"). In one example, the communication request may comprise an IM, such as sent using an IM application. In another example, the communication request may comprise an initiation of a VoIP call, a video chat and/or some other form of online communication. At 214, the communication service may forward the communication request from the user connection to the user's device. In one embodiment, forwarding the communication request can comprise sending a communication notification to the user device that is utilized to determine the availability status for the user, where the communication notification may be sent upon receiving the communication request from the user connection (e.g., where a change in availability status may result when the notification is not sent, etc.).

At 216, the user device can receive the communication notification and present it the user, at 218. As an example, a UI element may be displayed on a screen coupled with the user device, indicating that one of the user's connections wishes to communicate with the user. Further, in one example, the communication notification may comprise at least a portion of the communication (e.g., text of the IM). At 220, the user can select the notification, such as by "clicking on" and/or interacting with the UI element comprising the notification. As an example, the communication notification may "pop-up" on the user's smart-phone, and the user can "touch-activate" the notification (e.g., for a touch-screen) and/or use a device button to select the notification (e.g., to answer a call). In another example, an application (e.g., or portion thereof) may consume the notification directly without UI or user intervention. For example, a notification may comprise a service maintenance notification or load balance notification, where the client is being asked to connect to a different server, as the server it is currently connected to is not ideal (e.g., too geographically distant and/or presently being upgraded, etc.). Additionally, code may be executed, for example, upon receiving the notification (e.g., before user interaction). For example, a VOIP communications channel can be pre-established and/or message content can be downloaded from an external service.

At 222, selecting the communication notification can activate a communication application on the user device, where the communication application may be associated with a type of communication sent by the user connection. That is, for example, if the communication sent by the user connection comprises an IM, an IM application can be initiated on the user device. As another example, if the communication sent by the user connection comprises a VoIP message, a VoIP application can be initiated on the user device. It will be appreciated that because the corresponding communication application(s) may not be executing on the user device until the user "activates" the communication notification, computational resources and/or battery life of the user device may be conserved. It will also be appreciated that the types of communications, communication notifications and/or communication applications, etc. are not limited to the examples described herein. For example, any compatible communication, communication notification and/or communication application, etc. (e.g., and/or launching of corresponding application in lieu of notification selection) are contemplated herein.

Figure 3:
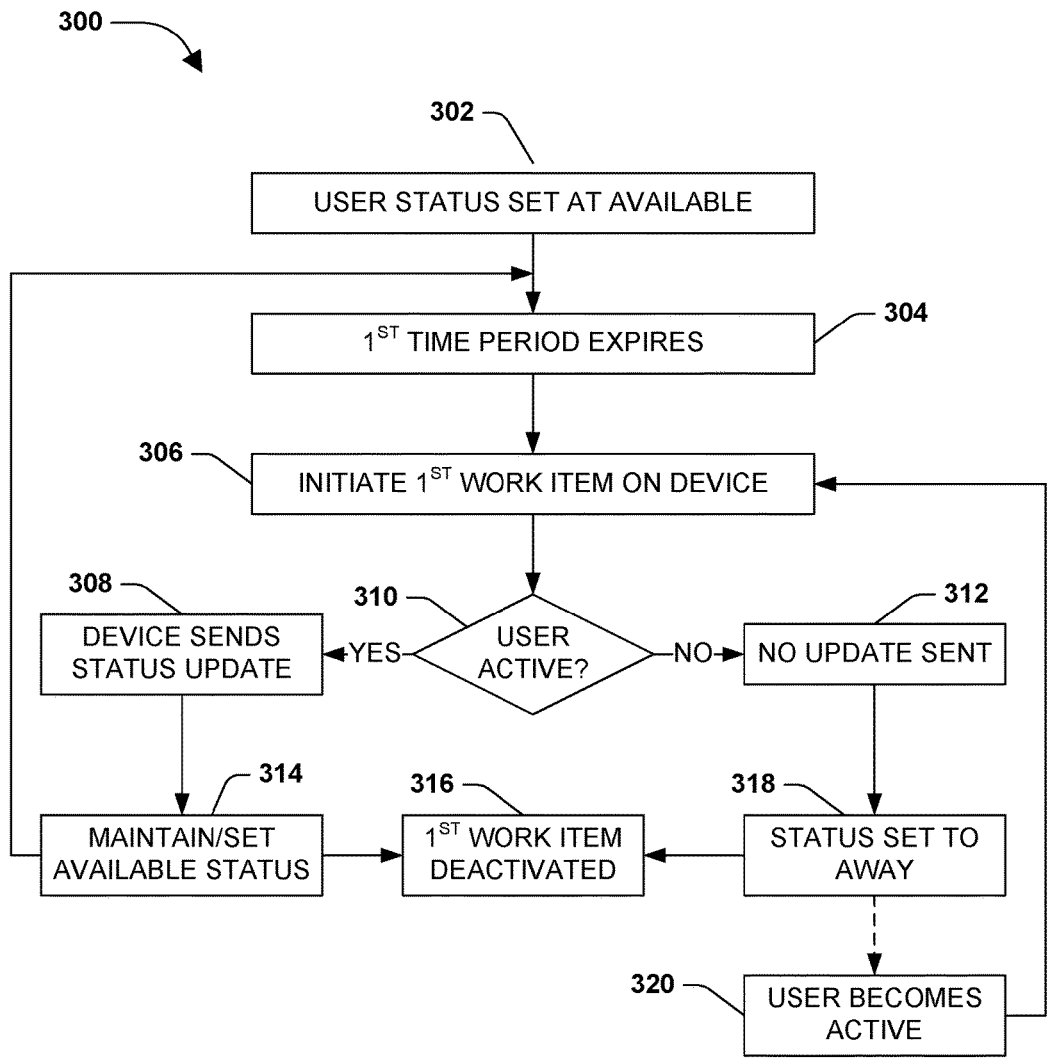
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. At 302, a user availability status is set to "available" (e.g., or some similar status), such as when the user initiates status monitoring (e.g., 202-210 of FIG. 2). At 304, a first desired time period expires. In one embodiment, the first desired time period may be used to indicate whether the user is actively using the device. As an example, the first desired time period may comprise a short period (e.g., fifteen minutes or less) between user activity determinations, such that a user's level of device activity may be determined every time the short period expires (e.g., every fifteen minutes).

At 306, a first work item (e.g., a background task) may be initiated on the device. As an example, a work item may comprise a small, short-lived program that executes in a background of an operating system for the user device to carry out particular (e.g., registered) functions. In one embodiment, the first work item may be activated at respective expirations of the first time period (e.g., every fifteen minutes), to perform an update to the user availability status, if necessary. Notably, intermittent execution of the work item consumes significantly fewer resources and/or power than a persistently running (communication) application (e.g., and allows for the device and/or one or more systems thereon to coalesce activity and remain inactive for periods of time, further promoting battery conservation).

At 310, an activity status of the user may be identified (e.g., using the first work item) to determine whether the user is active on the device. In one embodiment, the activity status may be indicated by the user's interactions with the device (e.g., and/or one or more elements, applications, and/or controls on the device), such as within a desired activity threshold (e.g., predetermined amount/degree of activity/interaction with the device). As an example, if the user is actively interacting with the device when the first desired time period expires and/or if (e.g., the first work item is able to detect that the user had interacted with the device during the first desired (e.g., fifteen minute) time period), it may be determined that the user is currently active.

However, the user may be currently active on the device without an actual interaction occurring at the time of the expiration of first the desired time period (e.g., the user may be between actions, and/or merely looking at the screen of the device). In one embodiment, the activity threshold may therefore indicate a period of time on either side of the expiration of the first desired time period (e.g., thirty seconds before and/or after), during which a user interaction with the device may provide an indication of a currently active user. As an example, the user may close a first application, the first desired time period may expire, and then the user may open a second application on the device. In this example, if the closing of the first application and/or the opening of the second application falls within the activity threshold (e.g., thirty seconds to either side of the first desired time period), the user may be considered "active" on the device, else the user may be considered not to be "active" on the device.

If the user is determined to be "active" (e.g., actively engaged with the device within past fifteen minutes) (YES at 310), then at 308 the device can send an "active" status update, such as to the communication service. As an example, the active status update may indicate that the user is still active on the device, and therefore may be available for communication from a user connection. At 314, the user's availability status may be maintained as "available." In one embodiment, when the user is actively interacting with the user device, the device may send an active status update (e.g., to the communication service) indicating the user's status, for example, and as long as at least one active status update is received by the communication service prior to expiration of the desired first time period, the user's availability status can be maintained as "available." Otherwise, the process reverts to 304 where after the desired first time period expires, the work item may again be initiated at 306.

If the user is determined not to be active on the device (NO at 310) no active status update may be sent by the device at 312. In this example embodiment 300, at 318, if the active status update is not received prior to the expiration of the first desired time period, the user availability status may be set to "away" (e.g., not immediately available for a communication; however, not offline). As an example, a user of a handheld computing device may periodically put the device down (e.g., put it in their pocket or bag) when not actively using the device. In this example, the user's device may still be connected to a network (e.g., the Internet), which may allow for communication with the user, but the user may not be engaged with the device at that particular time to immediately respond to an incoming communication from the user connection. Also, where loss of connectivity (e.g., internet, Wi-Fi, etc.) occurs for an extended period of time, an availability status associated with a mobile device, for example, may automatically be set to away, for example.

At 316, the first work item can be closed, for example, after the status update is sent or it is determined that the user is no longer active on the device (e.g., user turns off device, expiration of first time period without user activity). In one embodiment, at 320, after the availability status of the user has been set to "away", the user may initiate activity with the device, for example, by interacting with an element on the device. In this embodiment, the first work item may be initiated, at 306, the user may be determined to be active, at 310, and the device can send an active status update, for example, to the communication service. In this embodiment, the availability status for the user can be changed from away to available if the active status update is received within a desired second time period, for example, where the second time period generally comprises a longer time period than the first time period, and where the user's availability status may be closed (e.g., user is offline) if the second time period expires without user activity. That is, if the user does not interact with the device for a little while (e.g., first time period) the user status may be set to "away", and the user status may further be changed to "offline" if the user continues to not interact with the device (e.g., second time period) and/or connectivity of the device is lost, and this may occur in a resource and/or power conservative manner.

It will be appreciated that, unless indicated to the contrary, terms such as "first," "second," and/or the like are merely used herein as identifiers, names, designations, etc. (e.g., to be able to distinguish different elements from one another), and are not meant to imply an ordering, sequence, importance, temporal aspect, etc. For example, the first time period and second time period are not limited to sequential time periods (e.g., the first comes first and the second comes second in time). Further, it will be appreciate that the first time period and second time period are not limited to the embodiments described herein (e.g., there may be intervening time periods between the first time period and the second time period), and that those skilled in the art may devise alternate "time periods" that can provide an indication to adjust an availability of the user. For example, at an expiration of a first time period the user's availability status may change from a first available level to a second available level (e.g., from "immediately available" to "available but temporarily away". Further, in this example, after an expiration of a second time period, the user's availability status may change from the second available level to a third available level (e.g., from "available but temporarily away" to "available but busy"), and so-on.

Figure 4:
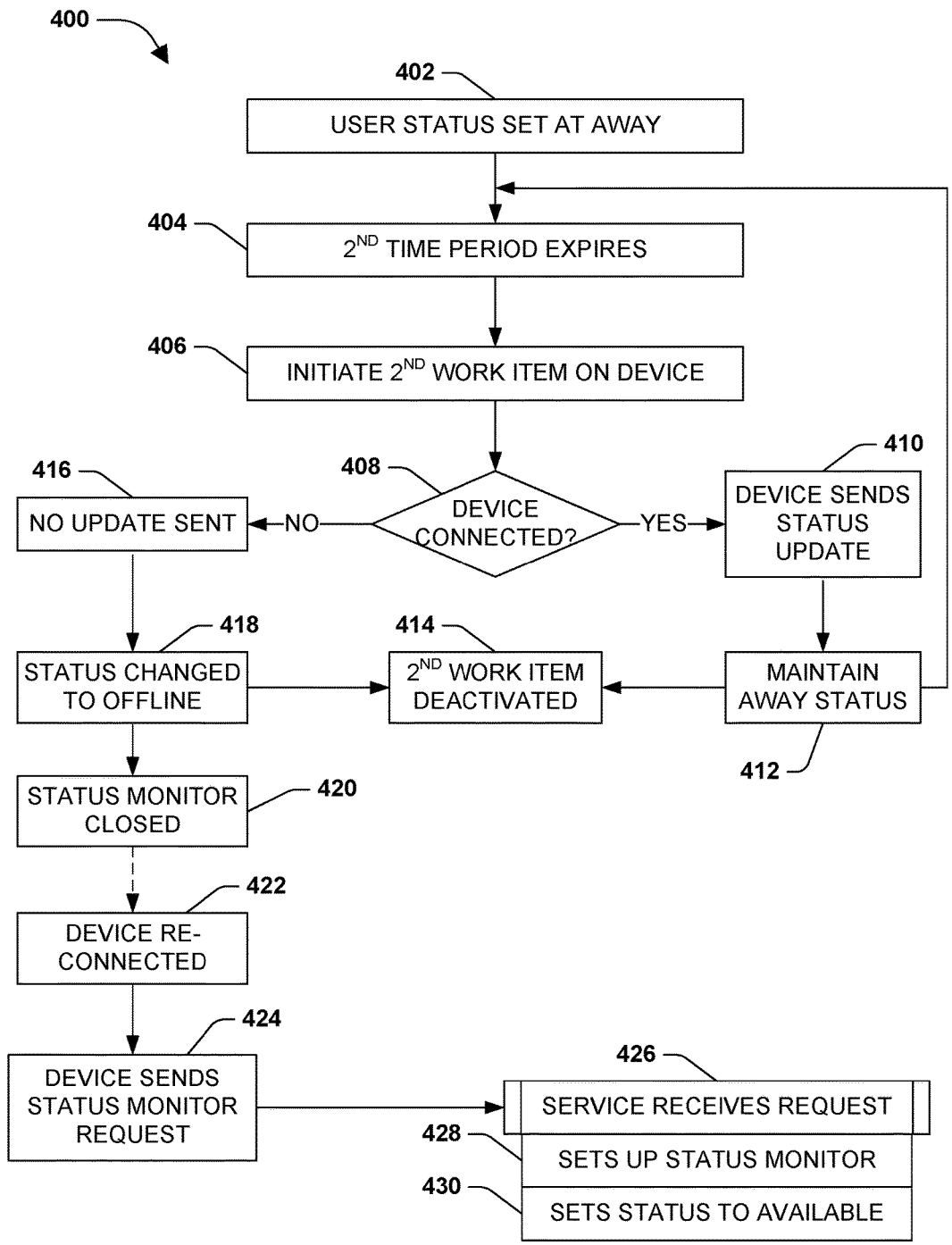
FIG. 4 is a flow diagram illustrating an example embodiment where one or more portions of one or more techniques described herein may be implemented.

FIG. 4 is a flow diagram illustrating an example embodiment 400 where one or more portions of one or more techniques described herein may be implemented. At 402, a user availability status is set to "away" (e.g., not immediately available for communication, but not offline (e.g., 318 of FIG. 3)). At 404, a second desired time period expires. In one embodiment, the second desired time period can comprise a longer period of time (e.g., three hours) than a first desired time period (e.g., fifteen minutes), where the user availability status may be set to "away" after the expiration of the first desired time period without user activity, but where the user availability status may be set to "offline" and where monitoring for activity of the user may be halted, for example, if the second desired time period expires without user activity and device connectivity is lost.

At 406, at or about the time of the expiration of the desired second time period, a second work item may be initiated (activated). In one embodiment, the second work item may be used to identify whether the user is still connected (e.g., device is still connected to the Internet). It may be appreciated that other events serve as triggering events as well. For example, a "battery charging" event on a mobile phone, for example, can trigger one or more work items to connect back to a service and update availability (e.g., refresh a session). At 408, it may be determined whether the device is still connected, such as to a user device network connection that comprises a communication connection between the user device and a communication service (e.g., over the Internet, another network connection, cellular connection, wired connection, etc.). Notably, intermittent execution of the work item consumes significantly fewer resources and/or power than a persistently running (communication) application (e.g., and allows for the device and/or one or more systems thereon to coalesce activity and remain inactive for periods of time, further promoting battery conservation).

If the device is connected (e.g., with the user device network connection) (YES at 408) an "online" status update can be sent, such as by the user device to the communication service, at 410. At 412, upon receiving the online status update, indicating that the user is still connected (but not active), the availability status of the user may be maintained as "away." In one embodiment, if the user's device maintains the connection with a network, the device may send the online status update (e.g., to the communication service) indicating the user's status, for example, and as long as at least one online status update is received by the communication service, prior to expiration of the desired second time period, the user's availability status can be maintained as "away" (e.g., connected but not immediately available).

If the device is not connected (e.g., NO at 408) no update may be sent, at 416. If no online status update is received within the desired second time period, at 418, the user's availability status can be changed to "offline' (e.g., not connected, and not available for communication). Further, at 420, the monitoring (management) of the user's availability status may be closed. As an example, the communication service may be managing a plurality of user availability statuses. In this example, the communication service may be able to mitigate computing resource use by closing the monitoring for user status where the user device is no longer connected (e.g., device turned off, network connection (permanently/indefinitely) lost, etc.). At 414, the second work item may be deactivated after changing the status to "offline" at 418 or maintaining the "away" status at 412.

In one embodiment, at 422, the user device may be reconnected, such as to a communication connection with the communication service. In this embodiment, upon reconnection, the user device may send a status monitoring request, at 424, such as to the communication service (e.g., as in 204 of FIG. 2). Upon receiving the request, at 426, the communication service may set up user status availability monitoring, at 428, and set the user's current availability status to "available" at 430 (e.g., as in 206 to 210 of FIG. 2).

In one embodiment, the availability status of the user can be provided without a persistent (e.g., and/or frequent in the case of a "http(s) long-poll" method) user device network connection, such as where the user device network connection and/or where a connection to a service may merely be intermittent. For example, some types of communication connections may be "spotty" (e.g., cellular, Wi-Fi, etc.), such as when the user may be travelling (e.g., through a tunnel, in an underground parking deck, etc.), yet the user may still be interacting with the device or away not but not completely disconnected (e.g., not powered-down). Accordingly, the device may merely need to have intermittent connectivity to be able to send a status update. As another example, a service used by the device (e.g., comprising a remote server) may be temporarily blocked (e.g., or degraded) for use by the user's device, such as behind a firewall, a service outage, etc. In this manner, a "fresh" availability status of the user may be able to be maintained even if the user is experiencing "spotty" connectivity and/or service outages, for example. Similarly, the user may still be considered to be "online" such that the availability of the user is not changed to "offline" even though the connectivity is "spotty". Moreover, such "fresh" availability status may continue to be able to be made available in a resource/power efficient manner (e.g., because a corresponding communication application need not be executing on the device). It may be appreciated that spotty network connectivity does not mean availability is constantly changing, which may be undesirable such as where notifications are provided on every availability transition, for example.

A system may be devised for providing an online communication availability status of a user to one or more user connections, for example, without having a corresponding communication application executing on a user device. As an example, the user device can send periodic status updates indicating a state of the user's communication availability, based on a level of user activity and/or the device's connection to a network. Further, in this example, if the status updates are received by a service providing the user's status to the user connections (e.g., other users), within a specified time period, the service can maintain the appropriate status of the user.

Figure 5:
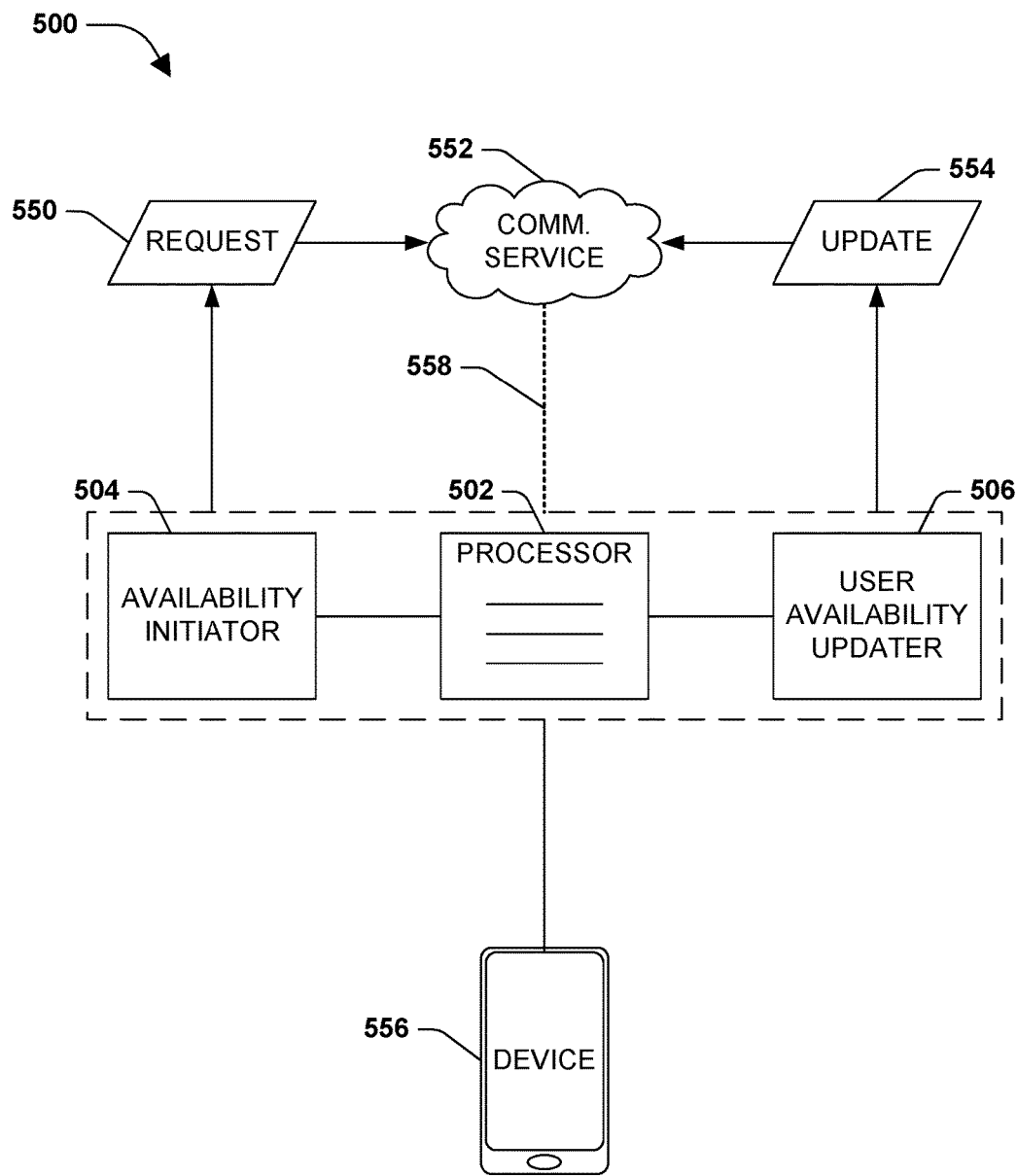
FIG. 5 is a component diagram illustrating an exemplary system for providing awareness of user availability.

FIG. 5 is a component diagram illustrating an exemplary system 500 for providing awareness of availability of a user using a device 556. In the exemplary system 500, a computer-based processor 502 is configured to process data for the system, and is operably coupled with an availability initiation component 504. The availability initiation component 504 is configured to send a request 550 (e.g., initiated at the device 556) to a communication service 552 to manage user availability for the user, for example, where the management of the user availability can provide the awareness of user availability to one or more user connections.

In the exemplary system 500, a user availability updating component 506 is also operably coupled with the processor 502. The user availability updating component 506 can be configured to send an active status update 554 to the communication service 552 if the user is active on a device 556. For example, if the user is actively interacting with the device (e.g., using an application) during a desired first time period (e.g., a short, activity threshold period) the user availability updating component 506 can send the update 554 to the service 552 to let the service 552 know that the user is still "available" for communications. Further, the user availability updating component 506 can be configured to send an online status update 554 to the communication service 552 if the device is connected to a network connection 558. For example, if the user device 556 is still connected to the network connection 558 (e.g., the Internet) during a desired second time period (e.g., a longer, connection threshold), the user availability updating component 506 can send the update 554 to the service 552 to let the service 552 know that the user device is still "online" (e.g., indicating that the user may not be immediately available for communication, but is not offline, so the user may eventually respond to a communication from a user connection/other user).

Figure 6:
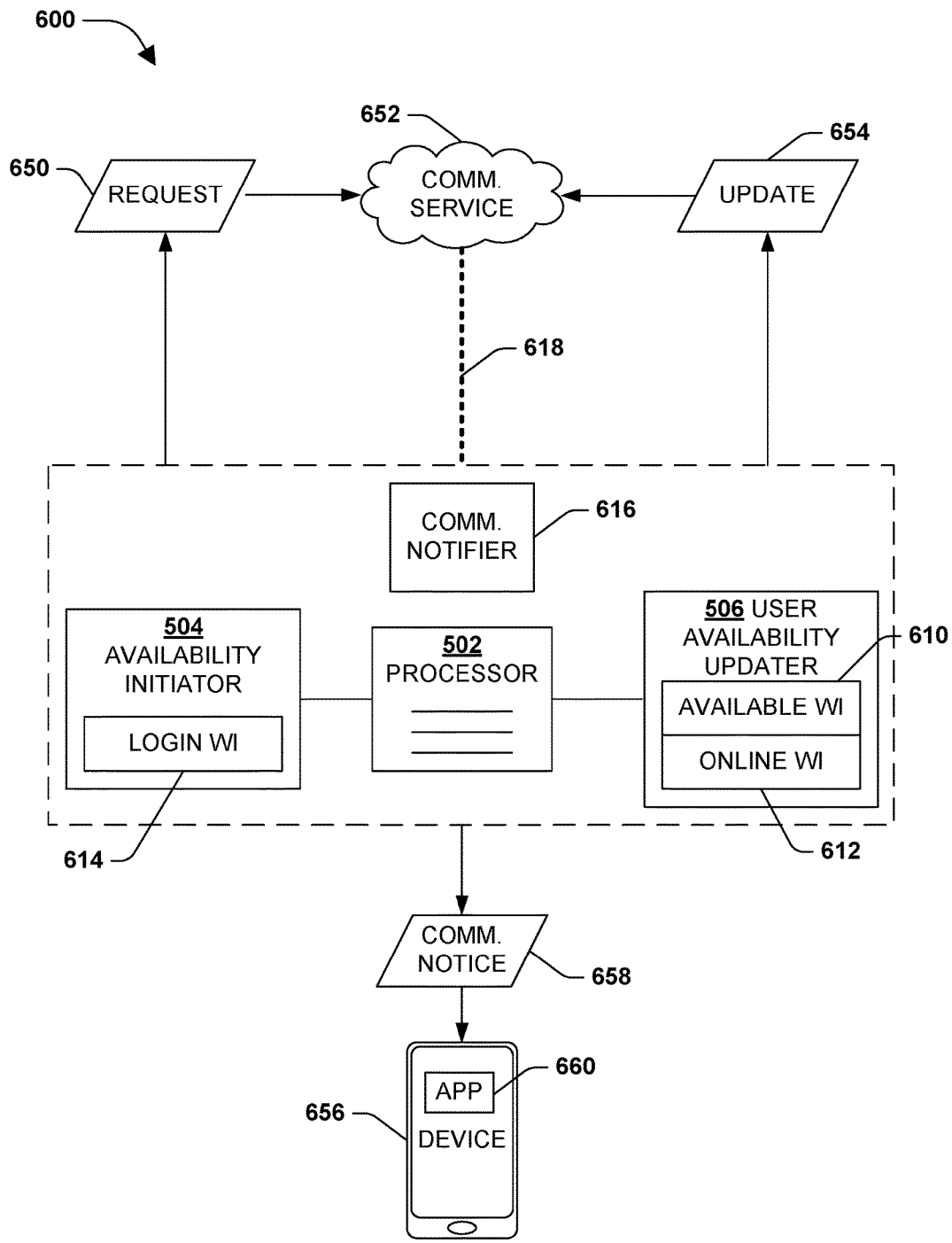
FIG. 6 is a component diagram illustrating an example embodiment where one or more portions of one or more systems described herein may be implemented.

FIG. 6 is a component diagram illustrating an example embodiment 600 where one or more portions of one or more systems described herein may be implemented. In this example 600, an extension of FIG. 5 is provided and thus description of elements, components, etc. described with respect to FIG. 5 may not be repeated for simplicity, for example. In this example embodiment 600, the user availability updating component 506 can comprise an available work item component 610. The available work item component 610 can be configured to be activated within and/or following an expiration of a desired first time period in order to send an active status update 654 to a communication service 652, if the user is active on the device 656. In one embodiment, the available work item component 610 can be configured to be activated to send the active status update to the communication service 652 upon detecting that the user is active on the device 656 (e.g., at respective or selected activity detections).

The user availability updating component 506 can comprise an online work item component 612 that may be configured to be activated within and/or following an expiration of a desired second time period in order to send an online status update 654 to the communication service 652, if the device 656 is connected to a network connection 618. Further, in one embodiment, the online work item component 612 can be configured to be activated to send the online status update to the communication service 652 upon detecting that the device 656 is still connected with the network connection 618 (e.g., at respective or selected connection detections).

In one embodiment, the user availability updating component 506 can be configured to provide a status update (e.g., the active status update and/or the online status update) for the user to the communication service 652 without having a corresponding communication application 660 in an execution state on the device 656. That is, for example, the communication application 660 does not need to be running on the device 656 in order for the user's availability status to be managed, such as by the communication service 652. Further, in one embodiment, the device may be connected to a network using a network connection 618 to the communication service 652. In this embodiment, the network connection 618 may merely be connected to the communication service 652 to send a status update 654. For example, the device 656 may not need to be constantly connected to the communication service 652 in order for the service to manage the user availability status updates, as long as the network connection is available when a status update 654 is sent.

In the example embodiment 600, the availability initiation component 504 can comprise a login work item component 614. The login work item component 614 can be configured to be activated at a user login to send the request 650 to the communication service 652 to manage user availability. In one embodiment, the user login can comprise activation of the device 656 (e.g., powering the device on); an activation of an online service for the user (e.g., the user logging into an online service account associated with the communication service); and/or logging into an application on the device 656 (e.g., the operating system, a communication application, etc.), etc.

A communication notification component 616 can be configured to provide an incoming communication notification 658 to the user upon receiving a communication notification from the communication service 652, where the incoming communication notification 658 can comprise a communication from another user (e.g., a user connection sending a video chat request to the user). Although not illustrated, it may be appreciated that the system 600 may comprise and/or be operatively coupled to a notification service such that the communication service can reach back to the device when needed (e.g., facilitating the device being "available", "reachable", etc. without an actual connection to the communication service). In one embodiment, the incoming communication notification 658 can be configured to initiate execution of a corresponding communication application 660 on the device 656, upon selection of the notification by the user. For example, the incoming communication notification 658 can be displayed to the user on the device 656, the user may select the notification 658, which can launch the corresponding communication application 660 on the device 656 (e.g., to communicate with the user connection). Alternatively, or additionally, a corresponding application (e.g., IM application) may be launched automatically based upon receipt of the (e.g., IM) communication notification.

Figure 7:
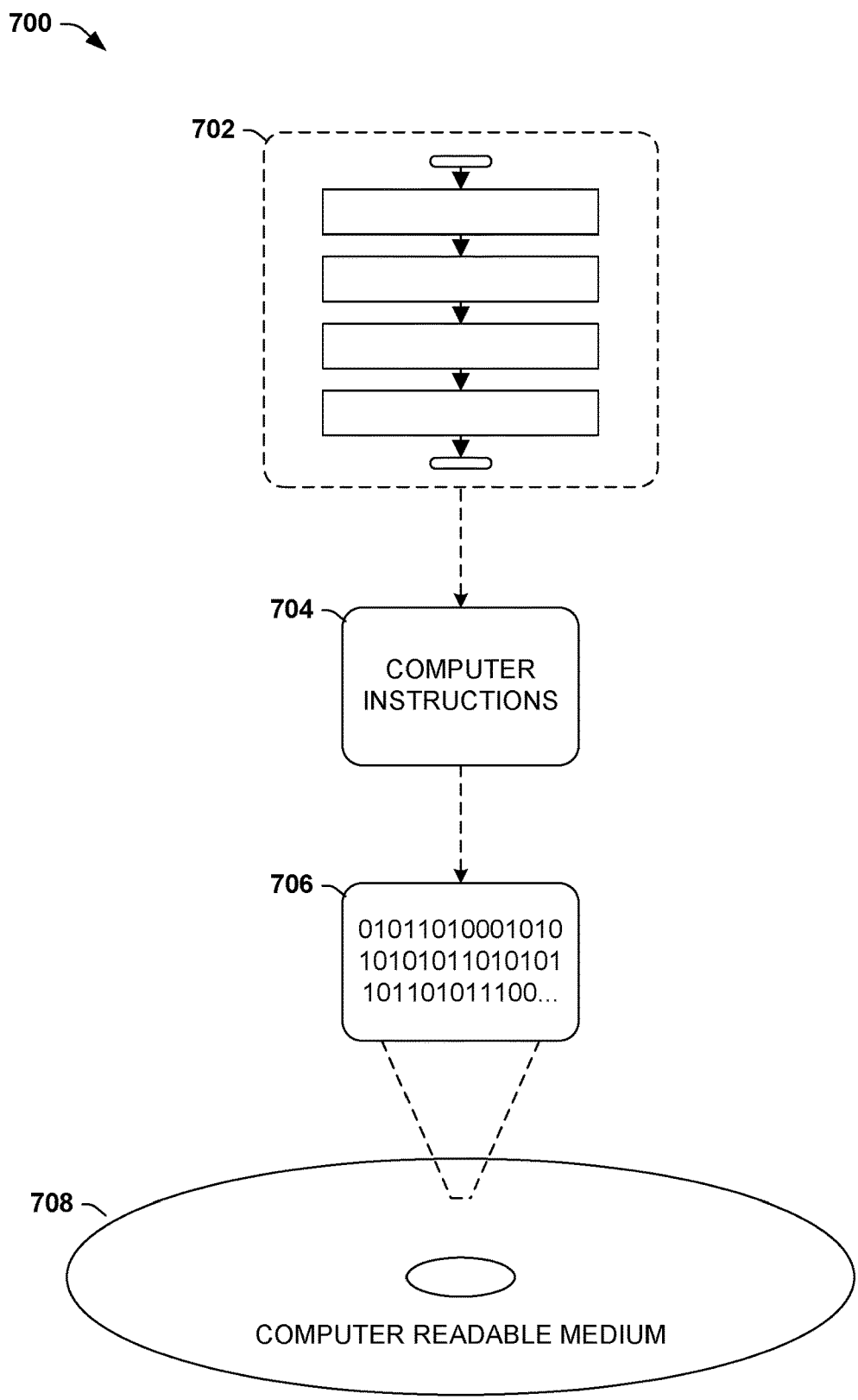
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
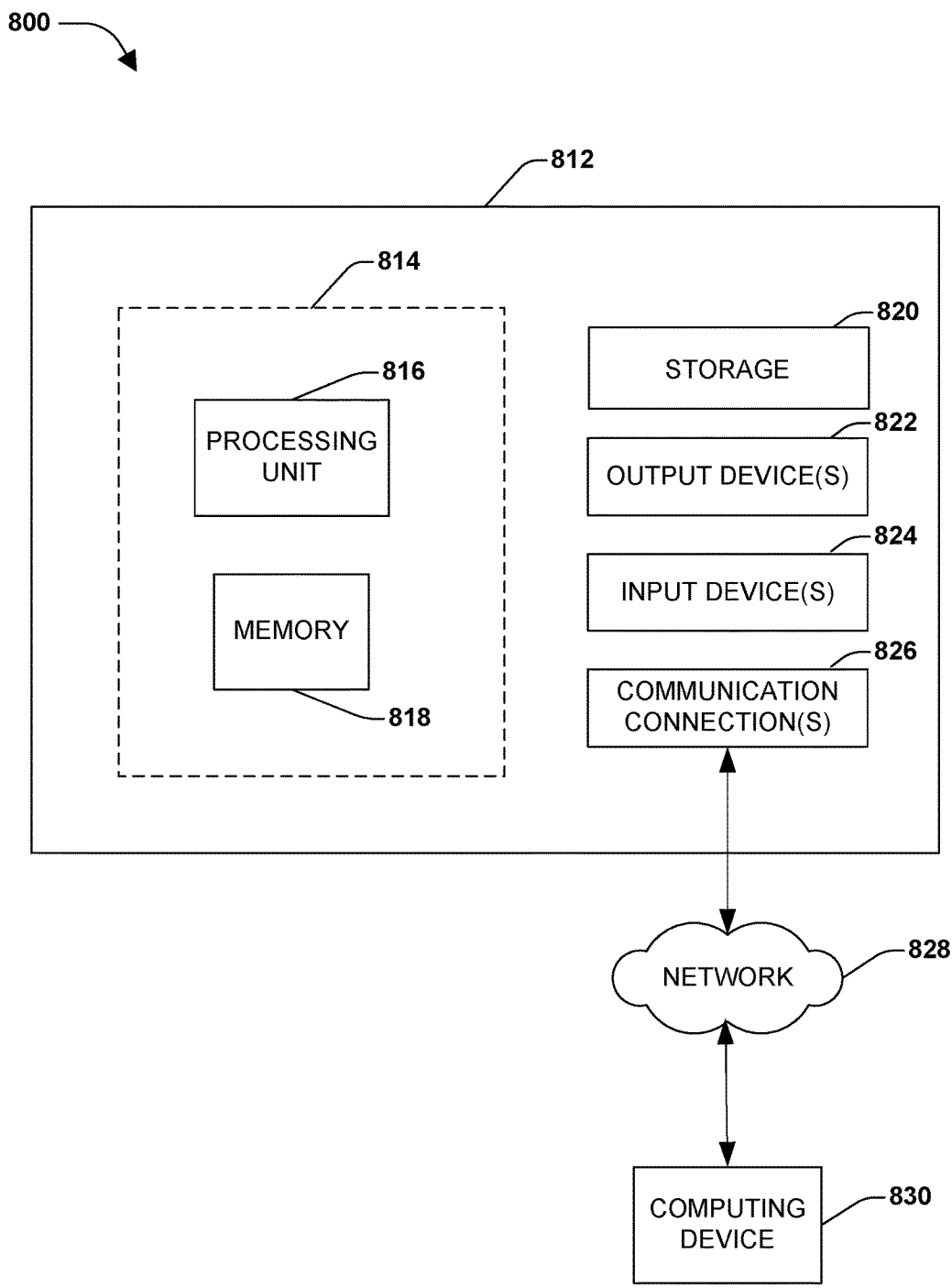
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for determining an availability status of a user of a communication device, comprising:

receiving one or more inputs indicative of one or more selections by the user of a plurality of communication capabilities about which the user chooses to provide status availability indications;

setting an availability status to available or unavailable for the plurality of communication capabilities about which the user chooses to provide status availability indications;

maintaining the availability status as available for at least one of the plurality of communication capabilities about which the user chooses to provide status availability indications if one or more active status updates are received for the user from a work item intermittently operating on a communication device associated with the user within a desired first time period, the work item being different than a communication application operating on the communication device and the one or more active status updates being based on activity data intermittently determined by the work item operating on the communication device, the activity data being indicative of one or more interactions of the user with the communication device at least one of during or proximate in time to the intermittent operation of the work item on the communication device, the activity data being required to exceed a predetermined amount of activity with the communication device before being determined by the work item as being sufficient to justify an active status update; and changing the availability status for at least one of the plurality of communication capabilities about which the user chooses to provide status availability indications, based on the one or more active status updates, to indicate that communication with the user is available for current communication via a first communication capability of the communication device but not available for current communication via a second communication capability of the communication device, the availability status of the user provided without the communication application in an execution state on the communication device, at least a portion of the method performed by a processing unit.

2. The method of claim 1, comprising changing the availability status from available to unavailable for at least one of the plurality of communication capabilities for which the user has chosen to provide status availability indications if the active status update is not received for the user within a desired second time period.

3. The method of claim 1, further comprising changing at least one availability status for at least one of the plurality of communication capabilities for which the user has chosen to provide status availability indications if the active status update is not received for the user within a desired second time period.

4. The method of claim 2, comprising:
at least one of:
changing the availability status from unavailable to available for at least one of the plurality of communication capabilities for which the user has chosen to provide status availability indications if the active status update is received within a desired second time period; or
changing the availability status from available to unavailable for at least one of the plurality of communication capabilities for which the user has chosen to provide status availability indications if the active status update is not received for the user within the desired second time period.

5. The method of claim 1, wherein changing the availability status for at least some of the plurality of communication capabilities for which the user chooses to provide status availability indications, based on the one or more active status updates, to indicate that communication with the user is available for current communication via a first communication capability of the communication device but not available for current communication via a second communication capability of the communication device comprises:
changing the availability status for at least some of the plurality of communication capabilities for which the user chooses to provide status availability indications to indicate that the user is available for current communication via a first communication capability of the communication device but unavailable for current communication via a second communication capability of the communication device.

6. The method of claim 1, changing the availability status for at least some of the plurality of communication capabilities about which the user chooses to provide status availability indications, based on the one or more active status updates, to indicate that communication with the user is available for current communication via a first communication capability of the communication device but not available for current communication via a second communication capability of the communication device comprises:
changing the availability status, based on the one or more active status updates, to indicate that communication with the user is available for current communication via a messaging communication capability of the communication device but not available for current communication via a voice communication capability of the communication device.

7. The method of claim 1, wherein changing the availability status for at least some of the plurality of communication capabilities about which the user chooses to provide status availability indications, based on the one or more active status updates, to indicate that communication with the user is available for current communication via a first communication capability of the communication device but not available for current communication via a second communication capability of the communication device comprises:
changing the availability status, based on the one or more active status updates, to indicate that communication with the user is available for current communication via a textual communication capability of the communication device but not available for current communication via at least one of a file transfer capability or a voice communication capability of the communication device.

8. The method of claim 1, wherein receiving one or more inputs indicative of one or more selections by the user of a plurality of communication capabilities about which the user chooses to provide status availability indications comprises:
receiving one or more inputs indicative of one or more selections by the user of a plurality of communication capabilities about which the user chooses to provide status availability indications, the plurality of communication capabilities being less than all of the communication capabilities of the communication device.

9. The method of claim 1, wherein the activity data being required to exceed a predetermined amount of activity with the communication device before being determined by the work item as being sufficient to justify an active status update comprises:
the activity data being required to exceed a predetermined amount of activity indicative of user interaction with the communication device within a period of time proximate the expiration of the first time period before being determined by the work item as being sufficient to justify an active status update.

10. A system for determining an availability status of a user of a communication device having a plurality of communication capabilities, comprising:
a processing device configured to process data;
a user availability updating component, operably coupled with the processing device, configured to perform one or more operations including at least:
receive one or more inputs indicative of one or more selections by a user of a plurality of communication capabilities about which the user chooses to provide status availability indications;

set an availability status to available or unavailable for the plurality of communication capabilities about which the user chooses to provide status availability indications;

maintain the availability status as available for at least one of the plurality of communication capabilities about which the user chooses to provide status availability indications if one or more active status updates are received for the user from a work item intermittently operating on a communication device associated with the user within a desired first time period, the work item being different than a communication application operating on the communication device and the one or more active status updates being based on activity data intermittently determined by the work item operating on the communication device, the activity data being indicative of one or more interactions of the user with the communication device at least one of during or proximate in time to the intermittent operation of the work item on the communication device, the activity data being required to exceed a predetermined amount of activity with the communication device before being determined by the work item as being sufficient to justify an active status update; and change the availability status for at least one of the plurality of communication capabilities about which the user chooses to provide status availability indications, based on the one or more active status updates, to indicate that communication with the user is available for current communication via a first communication capability of the communication device but not available for current communication via a second communication capability of the communication device, the availability status of the user provided without the communication application in an execution state on the communication device.

11. The system of claim 10, wherein the activity data being required to exceed a predetermined amount of activity with the communication device before being determined by the work item as being sufficient to justify an active status update comprises the activity data being required to exceed a predetermined amount of activity indicative of user interaction with the communication device within a period of time proximate the expiration of the first time period before being determined by the work item as being sufficient to justify an active status update.

12. The system of claim 10, wherein change the availability status for at least one of the plurality of communication capabilities about which the user chooses to provide status availability indications, based on the one or more active status updates, to indicate that communication with the user is available for current communication via a first communication capability of the communication device but not available for current communication via a second communication capability of the communication device comprises:

change the availability status for at least one of the plurality of communication capabilities about which the user chooses to provide status availability indications, based on the one or more active status updates, to indicate that communication with the user is available for current communication via a textual communication capability of the communication device but not available for current communication via at least one of a file transfer capability or a voice communication capability of the communication device.

13. The system of claim 10, wherein at least one of the received one or more active status updates includes a spotty coverage indication, and wherein change the availability status for at least one of the plurality of communication capabilities about which the user chooses to provide status availability indications, based on the one or more active status updates, to indicate that communication with the user is available via a first communication capability of the communication device but not available for current communication via a second communication capability of the communication device comprises:

change the availability status for at least one of the plurality of communication capabilities about which the user chooses to provide status availability indications, based at least partially on the spotty coverage indication, to indicate that communication with the user is available via a first communication capability of the communication device but not available for current communication via a second communication capability of the communication device.

14. The system of claim 10, further comprising sending a request to a communication service to manage user availability for a user, the request sent at at least one of:

a user login on the device;

an activation of the device;

an activation of an online service for the user; or a logging into an application on the device.

15. The system of claim 10, wherein the active status update includes a user-indicated preference of which of one or more communication protocols to use to contact the user.

16. The system of claim 10, wherein the plurality of communication capabilities about which the user chooses to provide status availability indications being less than all of the communication capabilities of the communication device.

17. The system of claim 16, wherein the one or more active status updates received from the work item intermittently operating on the communication device comprise one or more active status updates received from the work item intermittently operating on the communication device for the plurality of communication capabilities about which the user chooses to provide status availability indications.

18. The system of claim 10, comprising a network connection to the communication service, the network connection merely connected to the communication service to send a status update.

19. A computer readable storage device comprising computer executable instructions that when executed perform a method comprising:

receiving one or more inputs indicative of one or more selections by a user of a plurality of communication capabilities about which the user chooses to provide status availability indications;

setting an availability status to available or unavailable for the plurality of communication capabilities about which the user chooses to provide status availability indications;

maintaining the availability status as available for at least one of the plurality of communication capabilities about which the user chooses to provide status availability indications if one or more active status updates are received for the user from a work item intermittently operating on a communication device associated with the user within a desired first time period, the work item being different than a communication application operating on the communication device and the one or more active status updates being based on activity data intermittently determined by the work item operating on the communication device, the activity data being indicative of one or more interactions of the user with the communication device at least one of during or proximate in time to the intermittent operation of the work item on the communication device, the activity data being required to exceed a predetermined amount of activity with the communication device before being determined by the work item as being sufficient to justify an active status update; and changing the availability status for at least one of the plurality of communication capabilities about which the user chooses to provide status availability indications, based on the one or more active status updates, to indicate that communication with the user is available for current communication via a first communication capability of the communication device but not available for current communication via a second communication capability of the communication device, the availability status of the user provided without the communication application in an execution state on the communication device.

20. The computer readable storage device of claim 19, wherein the first communication capability includes a voice capability and the second communication capability includes a textual communication capability.

* * * * *